July 11, 1950
L. N. GOFF
2,514,485
WATER HEATING DEVICE
Filed Nov. 28, 1947
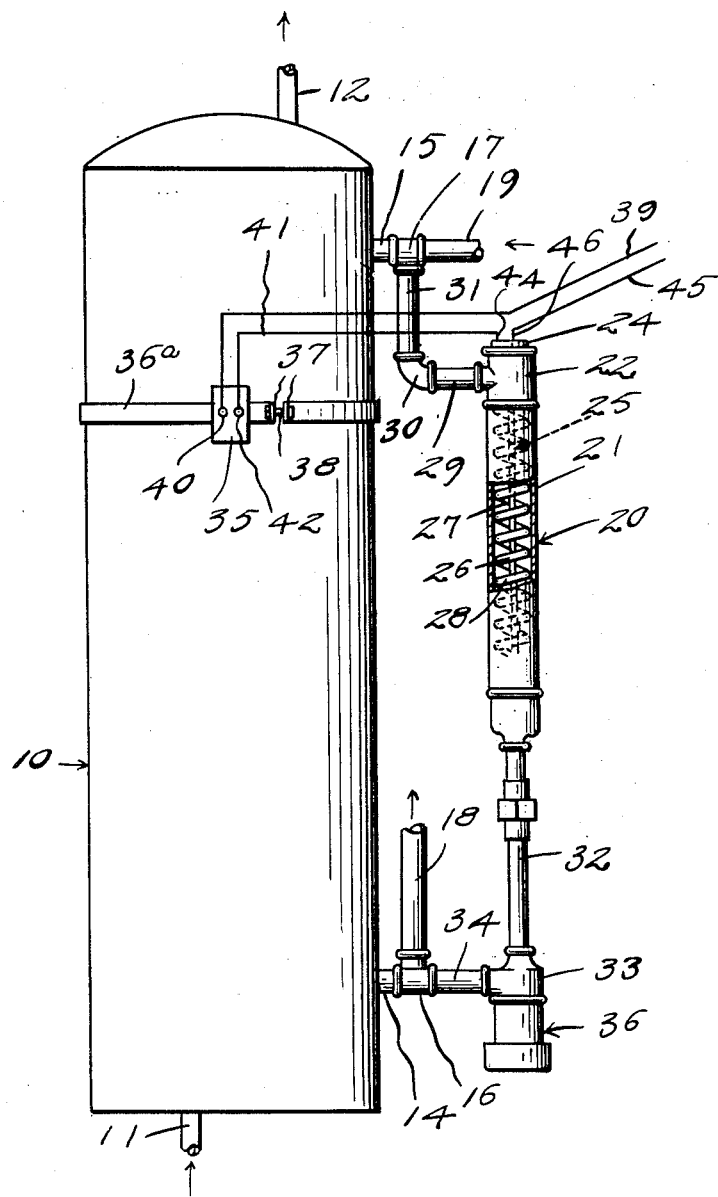
INVENTOR.
L. N. GOFF
BY
Kimmel & Crowell
Attorneys Patented July 11, 1950

2,514,485

UNITED STATES PATENT OFFICE 2,514,485

WATER HEATING DEVICE

Leland N. Goff, Midvale, Utah

Application November 28, 1947, Serial No. 788,709

1 Claim. (Cl. 219—39)

This invention relates to hot water heaters.

An object of this invention is to provide an improved hot water heater wherein the water can be maintained at a predetermined temperature for a predetermined quantity of water within the tank.

Another object of this invention is to provide in combination with a hot water tank which is connected to a furnace, an auxiliary heater which will maintain a predetermined quantity and temperature of water within the tank irrespective of the furnace operation.

A further object of this invention is to provide an auxiliary heater tank which is connected to the main hot water tank, the auxiliary tank having disposed therein an electric heating element which is energized by a thermostatic switch which is clamped onto the outside of the main tank so that the auxiliary heater will only be operative when the water temperature in the main tank falls below a predetermined degree. The clamp holding the switch onto the main tank is adjustable lengthwise of the main tank so that any desired quantity of water may be maintained hot independently of the furnace operation.

Yet another object of this invention is to provide an immersion type pressure line hot water heater of this kind so constructed and arranged that the water from the water jacket of the main heater tank does not come into contact with the electric heater coil, whereby the deposit from the water jacket is prevented from forming or settling on the auxiliary heater elements.

With the above and other objects in view, my invention consists in the arrangement, combination and details of construction disclosed in the drawing and specification, and then more particularly pointed out in the appended claims.

In the drawing, the figure is a side elevation, partly broken away and partly in section, of a hot water tank having an auxiliary electric heater constructed and arranged according to an embodiment of my invention.

Referring to the drawing, the numeral 10 designates generally a hot water heater tank for use in homes and the like for supplying hot water as required. The tank 10 is formed with an inlet or cold water connection 11 at the lower end thereof, and an outlet or hot water connection 12 at the upper end. A side outlet connection 14 is provided adjacent the lower end of the tank 10 and a side inlet 15 is provided adjacent the upper end of the tank 10 through which the water is adapted to pass from the heater to the tank.

A T-fitting 16 is connected to the outlet 14 and a T-fitting 17 is connected to the outlet 15. A tube or pipe 18 is connected to one end or outlet of the T 16 and is adapted to convey the water from the tank 10 to a conventional heating coil disposed within a furnace or other conventional heating system. The tube 19 connected to one opening of the T-fitting 17 conducts the fluid from the conventional heating element back to the tank.

In the use of the tank as described so far, the connections are more or less conventional to provide for the circulation of the fluid between the tank and the heating coil for heating all of the fluid contained within the tank. This type of heating is known as a thermosyphon type heater in which the return of the hot fluid from the coil forces the cold water at the bottom of the tank through conducting pipes to the heating element. This type of heating does not provide for a thermostat control and ordinarily does not provide sufficient heat for extended or frequent intermittent use of the hot water.

In order to provide for a thermostat control and a ready supply of hot water of a desired temperature within the tank at all times, I have provided an auxiliary heater 20 which is connected across the pipes 18 and 19 between the outlet connections 14 and the inlet connections 15 to the tank 10. The auxiliary heater 20 is formed of a cylindrical or tubular casing or housing 21, having a T-shaped fitting 22 at the upper end thereof. One opening of the fitting 22 is disposed coaxially with the axis of the housing 21. A plug 24 is engageable in the upper opening of the fitting 22 and a heating element 25 is fixed to or otherwise carried by the plug 24.

The electric heating element 25 is formed of a tubular coil member 26 for disposition within the housing 21. The heating wires are encased within the tubular member 26 and form a complete circuit within the housing 21 by the upwardly extending member 27 which is disposed within the coils 28 of the tubing or encasing means for the wires.

A pipe 29 is connected to the other opening of the fitting 22 and in turn connected to suitable elbows 30 and pipes 31 to the open connection of the T-fitting 17. A pipe 32 is connected to the lower end of the housing 21 to provide an inlet for the fluid and is connected to the outlet port of the tank by a suitable pipe 34 and elbow 33. As the elbow 33 is disposed below the tank 20 I have provided a suitable drain or cleaning connection 36 on the lower side of the elbow 35 for removing fluid and sediment from the auxiliary tank 20 as desired.

The member 36 may be formed as a filter or other suitable conventional sediment trap.

The fluid is adapted to pass through the pipes 34 and 32 into the housing 21 and out of the pipes 29 and 31 into the upper end of the tank 10. The circulation through the heater 20 and tank 10 is similar to the circulation of the fluid through the tank 10 and conventional heating coil to which the pipes 18 and 19 are connected.

In order to provide for thermostat control of the auxiliary heater 20, I have provided a thermostat 35 which is adapted to be disposed along the vertical length of the tank 20 at any selected or desired position. For mounting the thermostat 35 slidably on the tank 10, I have provided a strap 36ª which engages loosely about the outer walls of the tank 10. The strap 36ª is formed with outwardly extending ears 37 on each end thereof and a tightening bolt 38 engages through the ears 37 for tightening the strap 36ª for frictionally clamping the strap about the tank 10.

One wire 39 is connected to a terminal 40 on the thermostat 35. The wire 39 connects the thermostat to a source of electric supply. A wire 41 is connected to the other terminal 42 of the thermostat 35 and to a terminal 44 of the heating element 26. A wire 45 connects the other terminal 46 of the heating element 26 to a source of supply whereby a complete circuit is provided. By such an arrangement the thermostat 35 may be disposed at any position on the tank 10 so that water of any desired temperature may be had and the volume of water at this selected temperature may be controlled.

The auxiliary heater 20 is particularly adapted for use when the conventional heating coil is not used as in the summer time in most homes. If a large amount of hot water is desired within the tank 10, the thermostat 35 may be disposed near the lower end of the tank 10 so that the temperature of the water within the lower end of the tank will be held at the selected degree. As the water above the thermostat will be of a higher temperature than the water immediately adjacent the thermostat, the volume of hot water within the tank may be selected. At such times when only a small amount of hot water is required, the thermostat may be disposed closer to the upper end of the tank 10.

I do not mean to confine myself to the exact details of construction herein disclosed, but claim all variations falling within the purview of the appended claim.

Having thus described my invention, what I claim is:

In a hot water tank provided with upper and lower pipes for connection to a main heating means, an auxiliary heater connected across said upper and lower pipes, said auxiliary heater comprising a relatively small diameter tank, a spiral electric heating element depending in said small tank, a thermostat connected to said heating element, and a clamping and supporting band fixed to said thermostat and engaging about the main tank, said band being vertically adjustable on said main tank to thereby dispose said thermostat in a selected position for maintaining a predetermined temperature of the water in the main tank independent of the main heating means.

LELAND N. GOFF.

REFERENCES CITED

The following references are of record in the file of this patent:

UNITED STATES PATENTS

| Number | Name | Date |
| --- | --- | --- |
| 863,211 | Paul | Aug. 13, 1907 |
| 1,027,970 | Allen | May 28, 1912 |
| 1,122,989 | Newkumet | Dec. 29, 1914 |
| 1,439,340 | St. Clair | Dec. 19, 1922 |
| 1,698,596 | Hynes | Jan. 8, 1929 |
| 1,790,533 | Campbell | Jan. 27, 1931 |
| 2,104,045 | Knopp | Jan. 4, 1938 |
| 2,228,004 | Ewing | Jan. 7, 1941 |
| 2,245,085 | Abbott | June 10, 1941 |